Nov. 11, 1924.
J. C. JORDAN
1,515,491
ANTISKID OR TRACTION SHOE
Filed March 9, 1923   2 Sheets-Sheet 1
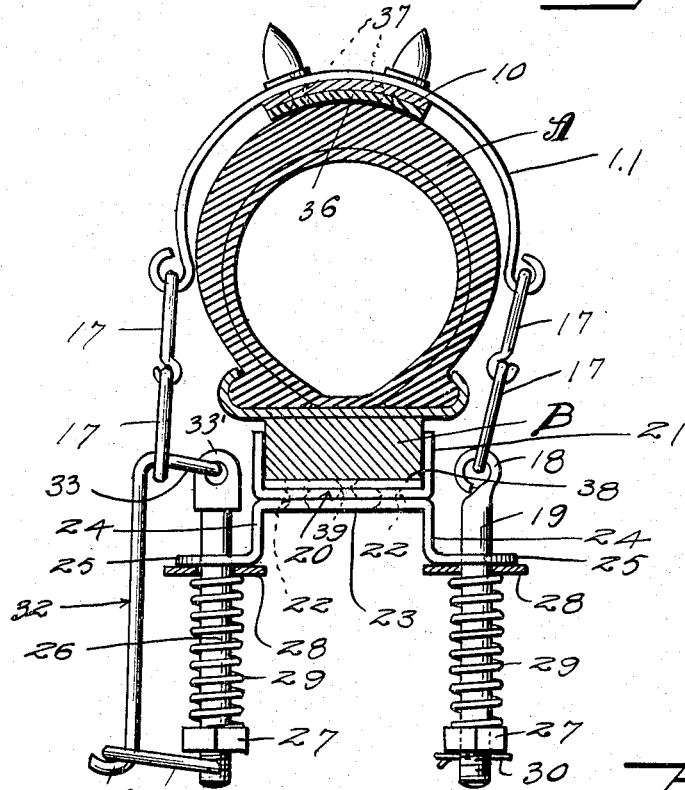
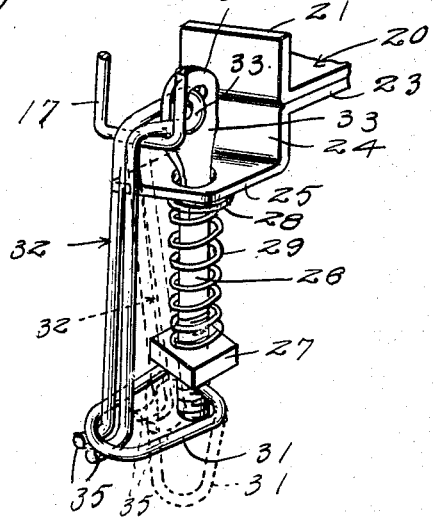
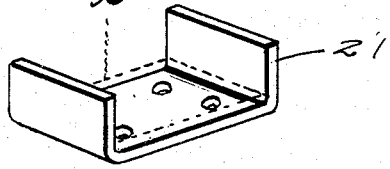
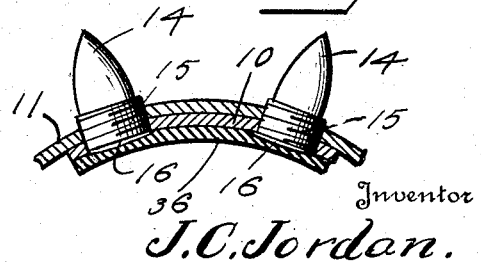
Inventor
J.C.Jordan.
By
Attorney Nov. 11, 1924.

J. C. JORDAN 1,515,491

ANTISKID OR TRACTION SHOE

Filed March 9, 1923  2 Sheets-Sheet 2

Inventor
J.C.Jordan.
By
Attorney

Patented Nov. 11, 1924.

1,515,491

UNITED STATES PATENT OFFICE.

JOSEPH C. JORDAN, OF READSTOWN, WISCONSIN.

ANTISKID OR TRACTION SHOE.

Application filed March 9, 1923. Serial No. 623,921.

*To all whom it may concern:*

Be it known that I, JOSEPH C. JORDAN, a citizen of the United States, residing at Readstown, in the county of Vernon and State of Wisconsin, have invented certain new and useful Improvements in Antiskid or Traction Shoes; and I do hereby declare the following to be a full, clear, and exact description of the invention, such as will enable others skilled in the art to which it appertains to make and use the same.

This invention relates to a shoe for vehicle wheels and is adapted to afford increased traction, particularly when the wheels are equipped with pneumatic or other rubber tires, in order to prevent or minimize skidding.

It is aimed to provide a novel, inexpensive and more efficient structure, attachable without necessitating elevation of the wheels, which is yieldable with the tire and adapted to be tensioned to a degree equal to its inflation when of the pneumatic type: a shoe which may flex laterally in a novel manner and is tensioned by novel means, and one which has a novel fastening or securing means to permit quick attachment or detachment with respect to the wheel.

Various additional objects and advantages will become aparent from a consideration of the description following taken in connection with accompanying drawings illustrating an operative embodiment.

In said drawings:—

Figure 1 is a view of the shoe in end elevation and as applied to a tire, the latter being shown in section;

Figure 4 is a perspective view of the felly-engaging bracket;

Figure 5 is a perspective view of the fastening or securing means, being shown closed in full lines and open in dotted lines, and Figure 6 is a detail sectional view on the line 6—6 of Figure 2 particularly illustrating the fastening of one of the calks.

Like reference characters designate like or similar parts in the different views.

Figure 2:
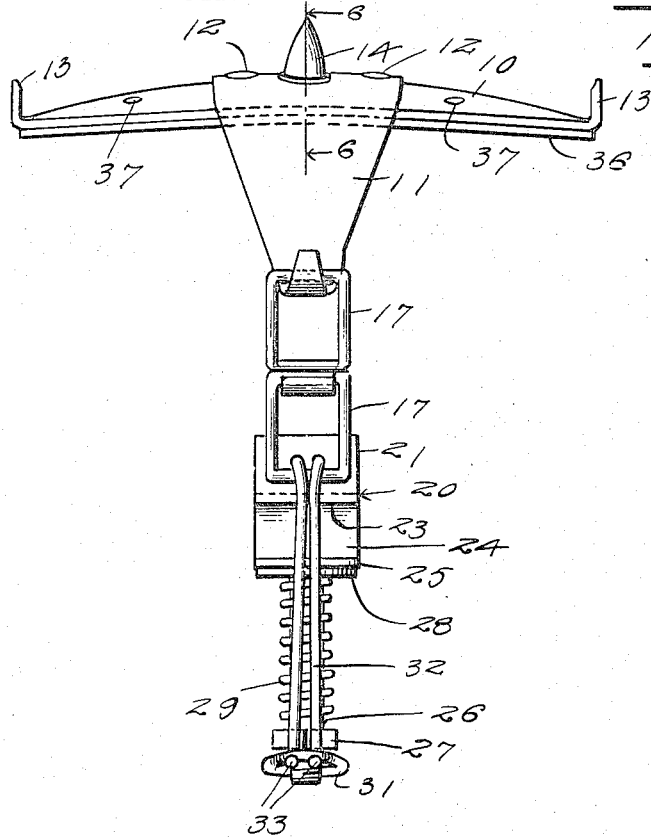
Figure 2 is a side elevation of the shoe.
Figure 3:
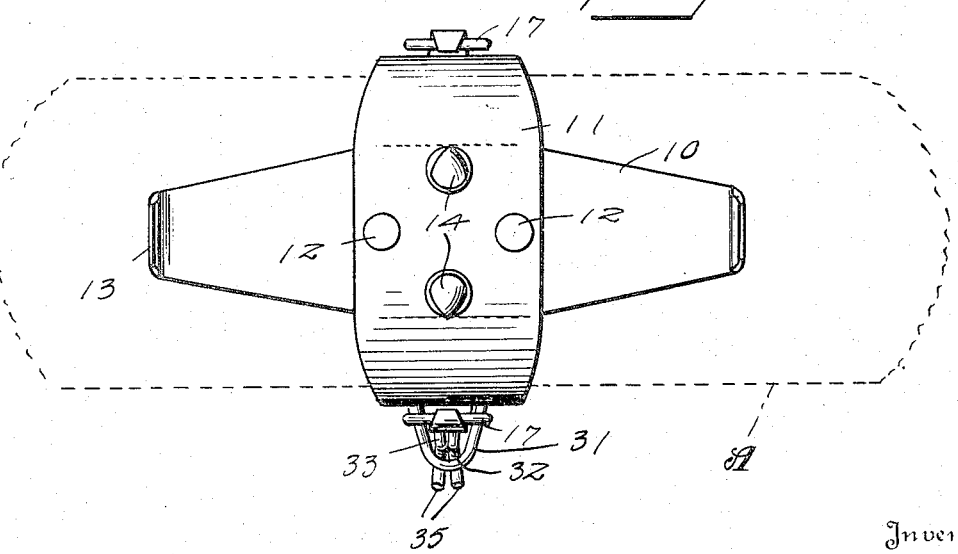
Figure 3 is a plan view of the shoe.

To facilitate an understanding of the invention, a pneumatic tire is shown at A as carried by a felly B and which parts are of a conventional wheel, usually the type used on automobiles.

In carrying out the invention, a traction plate is provided at 10 preferably being of metal, curved transversely and longitudinally according to the curvature of the tire A and adapted to intimately contact with the tread of said tire and circumferentially thereof. Another traction plate is provided at 11, being generally of arched shape and of metal similar to the plate 10. Plate 11 is preferably wider at the tread of the tire and diminishes in width toward the lower ends of the plate. Rivets at 12 may pass through the plates 10 and 11 in order to secure them together. Also the plates have suitable traction means extending therefrom. For instance plate 10 at each end is extended outwardly in order to form spurs or calks 13 whose outer edges may be sharpened if desired. Calks or spurs 14, sharpened or pointed if desired and as shown, are screw threaded at 15 into suitable openings in the plates 10 and 11. The inner ends of the calks 14 are upset as at 16 to further secure them in place and reinforce them against the strain to which they are subjected in use. It will be realized that such calks 14 may be replaced by filing away or otherwise removing the upset portions 16 and then unscrewing the calks, in order to be replaced by new ones screwed in place as at 15 and then upset at 16. The lower extremities of plate 11 are outwardly curled so as to pivotally connect one or more chain links 17 in depending relation at each side of the plate 11. Preferably two links are used at each side as shown but where the tire is mounted by a demountable rim, one or more links at each side should be added, that is relatively to a tire of a given size.

By means of a hook 18, one of the links 17 is pivotally connected to a bolt 19.

A felly-engaging bracket is provided at 20. Bracket 20 may have a U-shaped or bifurcated plate 21 adapted to embrace or fit the felly B as shown. Riveted or otherwise connected to plate 21 as at 22 is a bolt-mounting plate 23. Plate 23 is generally of U-shape and reversed with respect to the plate 21 and particularly has side portions 24 from which laterally offset ears 25 project. The bolt 19 is slidably disposed through an opening in one of the ears 25 while a bolt 26 is slidably disposed in the other ear 25. Nuts 27 are screw threaded on the bolts 19 and 26 and washers 28 are loosely placed on said bolts. Each bolt 19 and 26 is surrounded by an expansive coil spring 29 which bears at one end against the nut 27 thereon and at its other end against the washer 28 thereon urging the latter into contact with the under surface of the adjacent ear 25. A cotter key 30 may pass through the bolt 19 in order to prevent detachment of the nut 27 thereon while a loop 31 is passed through the bolt 26 in order to prevent detachment of the nut 27 thereon. Loop 31 is thus pivotally mounted.

A locking arm for the device is provided at 32 having an offset eye 33 at one end pivotally connected in an enlargement or head 33' of the bolt 26. At its other end, bolt 32 has hooks 35 projecting laterally therefrom in the opposite direction to the eyelet 33. This locking arm 32 may be made from a single strand of relatively stiff metallic wire as shown and intermediate the eyelet 33 and hooks 35 is preferably elongated and straight. Locking arm 32, with the hook end 35 foremost is adapted to be passed through the loop 31 and to hook at 35 against the under surface thereof in order to thereby lock the shoe in place. It is to be noted that the loop 31 provides an opening therethrough which tapers toward and is restricted at its outer end. At the inner end such opening is sufficiently large to readily permit the hooks 35 to pass therethrough while at its forward end, the hooks 35 cannot pass through said opening. When the hooks pass through the loop 31 at the rear as is necessary, the locking arm is inclined with respect to the axis of the bolts 19 and 26 so that after passage through the loop and the tire inflated, the locking arm 32 will be pulled into and maintained in parallelism with said bolts 19 and 26 so that the hooks cannot move upwardly or become detached accidentally from the loop 31.

It is preferable that the springs 29 remain at the same tension or degree of resiliency afforded by inflation of the tire A. The nuts 27, by adjustment on the bolts 19 and 26 enable variation in the tension of the springs 29 to attain this end.

The inner surface of the plate 10 may be suitably lined at 36 with a material, for instance rubber or felt, which will prevent chafing or injury to the tire. The lining 36 may be fastened to the plate 10 in any suitable manner and for instance by rivets 37. Also the bridge of the plate 21 may be lined as at 38 with material similar to that at 36 in order to prevent the plate from chafing the felly B. The lining 38 may be fastened in place by rivets 39.

The constructions shown may be readily applied to the wheel as shown in Figure 1 by engaging the plates 10 and 11 with the tread of the tire and the bracket 20 with the felly B and in thereafter passing the locking arm 32 through the adjacent link 17 and the hooks 35 thereafter through the loop 31 and into overlapping relation with the under surface of said loop 31. The reverse operation is followed in detaching the device. Attention is called to the fact that when the locking arm 32 is in unfastened position, that the bracket 20 may be freely swung on the bolt 19 as a pivot in order to place the bracket 20 in the most advantageous position for application or removal.

Particular attention is called to the fact that due to the springs 29, the plates 10 and 11 will at all times remain in intimate contact with the tire A and yield in unison therewith to the end that the calks 13 and 14 may at all times efficiently engage the road bed to afford traction and prevent skidding.

One or any suitable plurality of the devices may be used on each tire or wheel as will be understood and also it will be realized that elevation or jacking of the wheel is not necessary in order to apply or remove the device.

Various changes in the details may be resorted to provided they fall within the spirit and scope of the invention.

What I claim as my invention is:—

1. A shoe of the class described having a traction plate for disposition circumferentially of a wheel tread, said plate having its ends extending outwardly to form calks, an arch traction plate disposed transversely of said plate, calks screw threaded in openings in both of said plates, and the calks having portions upset against the inner surface of the first mentioned plate.

2. A shoe of the class described having a plate to engage a wheel felly, a mounting plate rigid with said plate, traction means, and resilient securing means for said traction means mounted by the last mentioned plate.

3. A shoe of the class described having traction means, flexible members secured to said traction means, one of said flexible members being attachable and detachable, a locking arm adapted to engage the last mentioned flexible member, a fastening loop for said arm, and resilient means normally urging said traction means into engagement with a tire and holding said locking arm in engagement with said loop.

4. A shoe of the class described having a traction means, attaching means therefor, said attaching means including a locking arm passable through the traction means, said arm having a hook, said attaching means having a fastening member engageable by said hook to maintain the locking arm in locked position and resilient means to normally urge the traction means into engagement with a tire and prevent disengagement of the hook and fastening member.

5. A traction shoe having traction means, tensioned attaching means therefor having a locking arm passable through the traction means, a fastening member through which the locking arm passes, and a hook on the locking arm to overlap and remain in contact with the under surface of the fastening member through the tension of the shoe in its fastened position.

6. A traction shoe having traction means, attaching means therefor having a locking arm passable through the traction means, a fastening member having an opening provided with a constricted portion, said locking arm being passable through said opening, and a hook on the locking arm to engage and remain in contact with the fastening member at its under surface adjacent the constructed portion thereof in fastened position.

7. A traction shoe having traction means, attaching means therefor having a locking arm passable through the traction means, said arm consisting of a strand of wire having an offset eyelet at one end by which it is pivotally mounted, a fastening loop having an opening constricted at a portion thereof, said locking arm being passable through said loops, and a hook on the locking arm extending in the opposite direction to said eyelet adapted to overlap and engage the loop below the constricted portion through the tension of the device in fastened position.

8. A traction shoe having traction means, attaching means therefor having a locking arm passable through the traction means, said arm consisting of a strand of wire having an offset eyelet at one end, a fastening loop having an opening constricted at a portion thereof, said locking arm being passable through said loop, a hook on the locking arm extending in the opposite direction to said eyelet adapted to overlap and engage the loop below the constricted portion, a slidable bolt to which said eyelet is pivoted, an expansive spring on said bolt tending to maintain said traction means in place, and said loop being carried by said bolt.

9. A traction shoe having a bracket adapted to engage a wheel felly, ears extending from the bracket, bolts slidable in said ears, expansive springs surrounding said bolts and at one end engaging said ears, means carried by said bolts engageable by the other ends of said springs, traction means, a flexible connection between said traction means and one of said bolts, a locking arm pivoted to the other bolt, a loop on the latter bolt, said traction means having a loop through which said locking arm passes, said first loop having its opening constricted adjacent one end, said locking arm also extending through said first loop, and said locking arm having a hook to overlap the under surface of the first loop adjacent the constricted portion and to be maintained so engaged through the tension of the device in fastened position.

In testimony whereof I affix my signature in presence of two witnesses.

JOSEPH C. JORDAN.

Witnesses:
  A. H. WARD,
  TRACY ANDERSON.